United States Patent

Radici et al.

[11] 3,979,481
[45] Sept. 7, 1976

[54] STABILIZATION OF ACETAL POLYMERS
[75] Inventors: Pierino Radici, Turate (Como); Gaudenzio Bianchi, Fagnano Olona (Varese); Paolo Colombo, Saronno (Varese), all of Italy
[73] Assignee: Societa' Italiana Resine S.I.R. S.p.A., Milan, Italy
[22] Filed: Dec. 16, 1974
[21] Appl. No.: 533,269

[30] Foreign Application Priority Data
Dec. 28, 1973  Italy .................................. 32345/73

[52] U.S. Cl. .................... 260/857 F; 260/45.95 H; 260/67 TN
[51] Int. Cl.² ......................................... C08L 77/02
[58] Field of Search ................................ 260/857 F

[56] References Cited
UNITED STATES PATENTS
| 3,555,514 | 11/1967 | Van De Walle | 260/857 F |
| 3,592,873 | 7/1971 | Ishida | 260/857 F |

*Primary Examiner*—Murray Tillman
*Assistant Examiner*—W. C. Danison
*Attorney, Agent, or Firm*—Flynn & Frishauf

[57] ABSTRACT
A stabilized polymeric composition comprising an acetal polymer and as stabilizer a copolymer R—D—A—B—D—R, in which:

A is a block of recurring units:

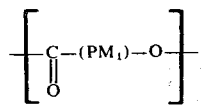

B is a block of recurring units:

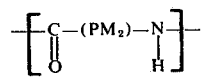

D is a block of recurring units:

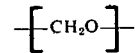

R is an ester, ether or urethane group wherein $PM_1$ and $PM_2$ are linear polymethylene chains having 2 to 13 and 3 to 13 carbon atoms, respectively, non substituted or having at least one hydrogen atom replaced by an alkyl, aryl, alkylaryl or cycloalkyl radical; the said stabilizer being used in a proportion of from 0.02 to 12 parts by weight to 100 parts by weight an acetal polymer.

7 Claims, No Drawings

STABILIZATION OF ACETAL POLYMERS

RELATED APPLICATIONS

This application is related to applications Ser. Nos. 533,267, 533,268 and 533,316, all filed Dec. 16, 1974.

The invention relates to a composition comprising an acetal polymer and a stabilizer belonging to a novel class.

In the following specification, "polymers" or "acetal polymers" should be understood as the products of a molecular weight exceeding 10,000, which are obtained in the art by polymerization of an aldehyde, or copolymerization of a plurality of different aldehydes, or by copolymerization of one or more different aldehydes with other non-aldehyde monomers, in which the terminal hydroxyl groups of the macromolecules have been converted to other groups of higher heat stability.

In the art various polymers of aldehydes or comprising aldehydes monomers moieties have been prepared such as:

the homopolymers of aldehydes or of their cyclic oligomers, such as formaldehyde, trioxane, tetraoxane and acetaldehyde;

copolymers of at least two different aldehydes;

copolymers containing in the macromolecular chain aldehyde units and recurrent units which can be defined by the general formula

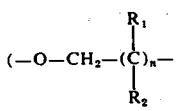

wherein $n$ is an integer from zero to 5 and $R_1$ and $R_2$ are inert substituents which are free of interfering functional groups. Copolymers of this type are disclosed e.g. by Canadian Pat. No. 773,159.

These copolymers can be obtained by copolymerizing one aldehyde (such as formaldehyde), or its cyclic oligomer (such as trioxane) with different monomers such as:

cyclic ethers, such as: ethylene oxide, 1,3-dioxolane and epiclorohydrin;

unsaturated vinyl compounds such as: styrene, vinyl methyl ketone, acrolein and vinyl ether;

ketenes such as dimethylketene.

It is known that the acetal polymers contain in such macromolecule at least one terminal hydroxyl group which makes the polymers unstable at the manufacturing and processing temperatures.

. Therefore, in the art these unstable polymers are treated by means of a suitable reagent in order to convert the terminal hydroxyl groups to other groups of higher stability.

To this end, the terminal hydroxyl groups of the macromolecules are converted to ester groups by reaction with anhydrides of carboxylic acids or with ketenes, or to ester groups of the carbamic acid or thiocarbamic acid by reaction with isocyanates or isothiocyanates, respectively.

Further processes are known for transesterification of the terminal hydroxyl groups of the polymers, or for etherification thereof, by reaction for instance with orthoesters and for the conversion to methyl ether groups by reaction with diazomethane.

As is well known, notwithstanding the conversion of the terminal groups, the acetal polymers are practically useless as plastics on account of their high sensitivity towards oxygen, heat, ultraviolet radiations and traces of impurities which are always present in a technical polymer.

This results in a decomposition of the acetal polymer, more particularly when subjected to heat, such as during the moulding at a molten state.

In order to obviate these undesirable phenomena, stabilizing substances, which are incorporated in the acetal polymer, are used in the art.

Normally, antioxidants are used for inhibiting the attack due to the action of oxygen and heat, said antioxidants being normally selected among substituted phenols and substituted diphenols.

However, in actual practice, such a stabilization by means of an anitoxidant is insufficient and, when processing the acetal polymer in a molten condition, substances deriving from the degradation of the polymer are constantly evolved.

These degradation products are, e.g., formaldehyde in case of polymers of copolymers of said monomers, or conversion products of formaldehyde, such as formic acid. The products of degradation of the acetal polymers are blocked by incorporating in the polymer substances of a basic character of either low or high molecular weight. In the latter case, the substances generally employed are polyamides.

A problem arising in the stabilization of acetal polymers is the degree of mutual compatibility of the stabilizer and polymer, having regard also to the high degree of crystallinity of the acetal polymers.

Thus, e.g., the stabilizing effect normally furnished by the polyamides is generally limited by incompatibility phenomena between the polyamides and the acetal polymer, so that even at a low concentration of the stabilizer the phase separation phenomenum is ascertained.

A further problem relating to the stabilization concerns the homogenization at a molecular level of the stabilizer with the acetal polymer. This meets with at least two obstacles of a technical and of a chemical-physical character, respectively.

As is well known, the addition of stabilizers to the polymer usually takes place during extrusion and a thorough homogenization is usually attained with an extruder which also exerts a considerable shearing effect on the macromolecular chains of the acetal polymer.

This action leads to phenomena of mechanical-chemical degradation of the material, which results in a decrease of the molecular weight due to splitting and, considering the peculiar chemical structure of the polyacetal, ultimately to instability towards heat.

In any case, the splitting of the macromolecular chain gives two shorter chains each carrying at one end a heat-unstable group.

In the case of homopolymers of formaldehyde and trioxane, the two chains resulting from splitting are degraded by heat, setting free formaldehyde and "Zippering" even in a full manner.

In the case of copolymers, the degradation goes on up to the first non-aldehyde unit contained in the chain, where the sequence is interrupted by bonds of another type. In any case, a more or less important decrease of the molecular weight takes place.

The above-described difficulties are overcome or at least strongly reduced according to the present invention by the use of a composition comprising a novel stabilizer for the acetal polymer.

Thus, the invention provides a stabilized composition comprising an acetal polymer and a block copolymer in an amount of from 0.02 to 12 parts by weight to 100 parts by weight of acetal polymer, said block copolymer having the following general structure

R — D — A — B — D — R wherein:

A is a polylactonic block of recurring units:

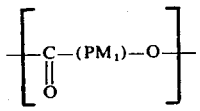

obtainable from one or more monomeric lactones of the following general formula:

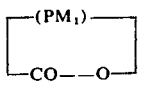

wherein $PM_1$ is a linear polymethylene chain having from 2 to 13 carbon atoms, non substituted or having at least one hydrogen atom replaced by an alkyl, aryl, alkylaryl or cycloalkyl radical.

The preferred lactones are ε-caprolactone, δ-valerolactone, β-propriolactone, pivalolactone and ω-enanthiolactone.

B is a polylactamic block of recurring units:

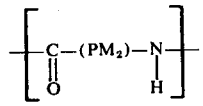

obtainable from one or more monomeric lactams of the general formula:

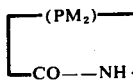

wherein $PM_2$ is a linear polymethylene chain having from 3 to 13 carbon atoms, non substituted or having at least one hydrogen atom replaced by an alkyl, aryl, alkylaryl or cycloalkyl radical.

The preferred lactams for the purpose of the invention are ε-caprolactam, ω-lauryllactam, α-piperidone, ω-enanthiolactam and α-pyrrolidone.

D is a polyoxymethylene block of recurring units:

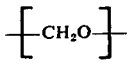

R is a terminal ester, ether or urethane group.

The copolymer R—D—A—B—D—R preferred for the purpose of the invention has a molecular weight of from at least 1,000 to 50,000 and a proportion of blocks D of from 5 to 90% by weight, the weight ratio of the blocks B to A varying from 1:1 to 99:1, preferably from 3:1 to 99:1.

In the following, the term "copolymer D—A—B—D" denotes the unstabilized block copolymer carrying terminal hydroxyl groups and the term "stabilized copolymer D—A—B—D" denotes said block copolymer carrying said terminal groups R.

The copending application Ser. No. 533,267, filed Dec. 16, 1974, by applicants describes the copolymers D—A—B—D as novel materials useful in the field of threads and yarns and moulded products or as technopolymers for special uses as metal substitutes.

According to said application, the copolymer D—A—B—D can be obtained by preparing a block copolymer A—B by reaction of the said lactam and lactone monomers in the presence of an anionic catalyst and purifying the resulting copolymer A—B in order to make it suitable for its subsequent reaction with formaldehyde.

The copolymer D—A—B—D is then prepared by polymerization of formaldehyde in a liquid reaction medium comprising the purified copolymer A—B dissolved or preferably suspended in said medium.

Finally, the copolymer D—A—B—D is stabilized by converting its unstable terminal hydroxyl groups to groups R.

According to the invention, the block copolymers R—D—A—B—D—R acts as novel and efficient stabilizers for acetal polymers.

More particularly, the said stabilizers avoid drawbacks due to mutual incompatibility occurring when using known stabilizers such as polyamides.

The polyoxymethylene blocks present in the block copolymers R—D—A—B—D—R improve the mutual compatibility of the different etherochains and afford a thorough homogenization of the acetal polymer with the stabilizer.

In this connection, it should be noted that the proportion of polyoxymethylene blocks in the block copolymers is an important factor and the best results are obtained by maintaining the said proportion within the hereinbefore defined range.

The block A of the block copolymers improves also the homogenization of the stabilizer with the acetal polymer. This effect depends, in addition to the chemical and structural properties of the block A, upon the proportion of said block in the block copolymer, the range of values of said proportion allowing the best results having already been stated.

In any case, homogenization of the stabilizer with the acetal polymer is possible under bland conditions, e.g. in a conventional extruder effecting a mixing action such that it avoids splitting and degradation which entail a decrease of the molecular weight of the acetal polymer as well as a loss of useful product.

In other words, it is possible to obtain a thorough homogenization of the acetal polymer and stabilizer, while avoiding the shearing action which give rise to the previously described undesirable effects.

On the other hand, the thorough homogenization affords an improved utilization of the stabilizer, and ultimately the use of quantities of stabilizer smaller than by employing conventional stabilizers.

The physical-mechanical properties, above all the mechanical-dynamic properties of the acetal polymer are at times considerably affected by the presence of foreign components, for the latter substances are a disturbing element in the crystalline structure, e.g. in the resulting moulded parts.

The necessity therefore arises of employing stabilizers in a quantity as low as possible, this being possible by employing the stabilizer of the invention.

Moreover, the block copolymers R—D—A—B—D—R in addition to an improved stabilizing activity distinguish by not being extractable (by means of aqueous solutions or organic solvents) from the acetal polymer or its artefacts.

Thus, the composition according to the invention can be used in the manufacture of mechanical components and of containers in which pharmaceutical products and foodsuffs can be packed.

The block copolymers R—D—A—B—D—R are generally obtained in the form of powders having a grain size of from 50 to 600 microns and a bulk density of the order of 0.1–0.5 g/ml depending upon the method of preparation.

In continuous stabilization, the acetal polymer in powder form is mixed and cold-homogenized with the stabilizer up to a concentration of the latter of the order of 15–40% by weight in the mixture (masterbatch). The mixture rich in stabilizer thereby obtained is subsequently added to the main stream of the acetal polymer and homogenized in the hot in an apparatus, such as an extruder, suitable for pelletizing polymers. Obviously, the feeds are so adjusted that the concentration of the stabilizer in the acetal polymer falls within the abovedescribed range.

In stabilizing the acetal polymer, an anti-oxidant, as referred to previously, can be added to the composition. The antioxidant is normally selected among substituted phenols and substituted bisphenols.

Examples of such compounds are: 4,4'-thiobis(6-tert-butyl-meta-cresol); 4,4'-butylidenebis (6-tert-butyl-meta-cresol); pentaerythritol tetra(beta-4'-hydroxy-3',5'-di-tert-butyl phenyl) propionate; n-octadecyl (beta-4'-hydroxy-3',5'-di-tert-butyl phenyl) propionate; and 2,2'-methylenebis (4-methyl-6-tert-butyl-phenol).

Optimum results are obtained with a proportion of anti-oxidant from 10 to 100 parts by weight to 100 parts by weight of the block copolymer R—D—A—B—D—R.

The said antioxidant is generally incorporated in the composition in a proportion of from 0.02 to 2 parts by weight, preferably from 0.1 to 0.6 part by weight to 100 parts by weight acetal polymer.

In the following experimental Examples, the parts and percentages are by weight unless otherwise specified.

EXAMPLE 1

Preparation of the stabilizer

110 Parts pure ε-caprolactam stirred at 110°C in an inert atmosphere are admixed with 0.3 part sodium metal in a 50% paraffin dispersion. On completion of the formation of the metal lactam, 100 parts pure dimethyl sulphoxide and 9 parts ε-caprolactone are added.

The temperature is brought to 150°C and maintained as such during a period of 3.5 hrs during which an increase in viscosity of the solution is ascertained, followed by cooling whereby a block copolymer A—B precipitates in the form of a fine powder.

The resulting suspension is thoroughly washed with toluene to remove any soluble residue from the polymerization medium.

The analysis shows:

| | |
|---|---|
| % conversion of the monomer charge | = 98 |
| nitrogen percentage | = 11.46 |
| lactone percentage | = 7.5 |
| reduced viscosity (liters.g$^{-1}$) | = 1.40 |

In the Examples, the A—B copolymer viscosity is measured at 35°C from a solution of m-cresol containing 0.5 wt.% copolymer and expressed as the ratio $$\eta \text{ reduced} = \frac{\eta \text{ specific}}{\text{concentration}}$$

in liters.g$^{-1}$.

| | |
|---|---|
| melting point (°C) | = 210 |
| grain size | |

>88 microns : 0.3%
88–40 microns : 33.7%
<40 microns : 66.0%.

200 Parts of the copolymer A—B prepared as above are charged to a polymerization reactor containing 1,000 parts toluene. The reactor is provided with a stirrer and a system for ensuring inert conditions by means of a nitrogen flow. Pure monomeric formaldehyde is supplied in a quantity of 2.5 parts per minute, during 12 minutes, the temperature being adjusted at 20°–25°C by means of a water bath. On completion of the supply of formaldehyde, stirring is effected during 10 minutes followed by filtering. After washing and drying in a vacuum oven at 60°C, the purified block copolymer D—A—B—D is esterified.

To this end, a mixture comprising a 1.1 parts pure acetic anhydride and 3.3 parts n-dodecane for each part of the D—A—B—D copolymer is reacted at 140°–145°C during 20 minutes. On completion of the reaction, the resulting suspension is cooled, thoroughly washed with dimethyl sulphoxide then with acetone and finally dried.

The analysis of the stabilized copolymer D—A—B—D yields the following data:

| | |
|---|---|
| overall percentage yield with respect to feed | = 97.2 |
| nitrogen percentage | = 9.83 |
| A-B percentage | = 85.8 |
| intrinsic viscosity | = 1.35 |

In the Examples, the viscosity of the D—A—B—D copolymer, of the acetal polymers and of the stabilized acetal polymer compositions is measured at 60°C from a solution of p-chlorophenol with 2% α-pinene containing 0.5 wt.% copolymer, acetal polymer or composition and expressed as the ratio $$\eta \text{ intrinsic} = \frac{\eta \text{ relative}}{\text{concentration}}$$

in liters.g$^{-1}$.
$K_{220} = 0.006$

This latter datum is obtained in a thermal degradation test and expressed as the weight loss percentage per minute during the first 30 minutes, measured at 220°C, in a nitrogen atmosphere, by a thermoscale.

Stabilization of the acetal polymer 23.2 Parts of the stabilized copolymer D—A—B—D obtained as described are mixed with 16 parts 4,4'-butylidenebis (6-tert-butyl-meta-cresol) and with 60.8 parts polyoxymethylene diacetate of an intrinsic viscosity of 1.40. This formaldehyde homopolymer has been obtained by polymerization of monomeric pure formaldehyde in toluene, in the presence of an anionic initiator and subsequently esterified with acetic anhydride in order to block the terminal groups.

987.5 Parts of a polyoxymethylene diacetate having an intrinsic viscosity of 1.78 are admixed with 12.5 parts of the products rich in stabilizers prepared as described above. In this manner, the resulting composition contains 0.29% of the stabilized copolymer D—A—B—D and 0.20% of the phenolic antioxidant, the composition being melted, extruded and converted to pellets of 2 × 2 mm at 190°–220°C by a screw extruder with an automatic cutting blade. The following tests are effected on the pellets:

$K_{220}$ : previously defined $D_{220}$ : thermal degradation at 220°C in air, expressed in weight loss percentage of the polymer after 10 and 20 minutes heating, respectively.

These determinations are carried out by means of a thermoscale, continuously draining away the degradation products by flowing a stream of nitrogen and air, respectively. The results are summarized in Table 1 sub POM-1. In parallel, the same tests are carried out on a comparative sample of the same formaldehyde polymer stabilized by 0.2% 4,4'-butylidenebis(6-tert-butyl-meta-cresol) pelleted as described above. The results are given in Table 1 sub POM-1(c).

Table 1

|  | colour | $K_{220}$ | $D_{220}$ 10' | 20' |
|---|---|---|---|---|
| POM-1 | white | 0.03 | 0.4 | 0.9 |
| POM-1(c) | white | 0.12 | 5.4 | 10.2 |

EXAMPLE 2 (COMPARATIVE EXAMPLE)

A sample of finely subdivided polycaprolactam and the antioxiadant n-octadecyl (beta-4'-hydroxy-3',5'-ditert-butyl phenyl) propionate are added in a proportion of 0.30 and 0.35%, respectively, to the polyoxymethylene diacetate in powder form, having an intrinsic viscosity of 1.78, already employed in the first Example.

The mixture is accurately homogenized, then melted in the cell (of the type for thermoplastics) of a Plasti Corder PLV 151 (Brabender).

The cell is thermostated with a heating oil at 220°C, the number of revolutions of the rotor being of 120/min. Two tests are carried out with a residence time of 6 and 12 minutes, respectively.

The weight losses percentage during plasticizing is measured and the intrinsic viscosity and heat stability are determined on the product. The results are given in Table 2 sub POM-2. In the Table, $\Delta C$ denotes the weight loss percentage of polymer during the melting in the cell, in the form of gaseous products (formaldehyde and oxidation products thereof), and $\eta_e$ denotes the intrinsic viscosity.

EXAMPLE 3 (COMPARATIVE EXAMPLE)

A sample of polyester polyamide obtained by anionic copolymerization of caprolactam with caprolactone in the same mutual ratio as in the copolymer A—B described in Example 1 (7.5% lactone) and n-octadecyl (beta-4'-hydroxy-3',5'-di-tert-butylphenyl)propionate are added in a proportion of 0.30 and 0.35%, respectively, to the same polyoxymethylene diacetate powder as in Example 2.

The same tests and determinations as in Example 2 are effected on the mixture.

The results are summarized in Table 2 sub POM-3.

EXAMPLE 4

A sample of the stabilized copolymer D—A—B—D prepared as described in Example 1 and n-octadecyl (beta-4'-hydroxy-3',5'-di tert-butylphenyl) propionate are added in a proportion of 0.30 and 0.35%, respectively, to the same polyoxymethylene diacetate powder as in Example 2. The mixture is subjected to the tests and determinations indicated in Example 2. The results are summarized in Table 2 sub POM-4.

Table 2

|  | POM-2 | | | POM-3 | | | POM-4 | | |
|---|---|---|---|---|---|---|---|---|---|
| Time | $\Delta C$ | $K_{220}$ | $\eta e$ | $\Delta C$ | $K_{220}$ | $\eta e$ | $\Delta C$ | $K_{220}$ | $\eta e$ |
| 6' | 0.9 | 0.08 | 1.71 | 0.7 | 0.07 | 1.73 | 0.5 | 0.05 | 1.75 |
| 12' | 1.3 | 0.06 | 1.66 | 1.0 | 0.06 | 1.69 | 0.7 | 0.05 | 1.74 |

EXAMPLES 5 AND 6 (COMPARATIVE EXAMPLES) AND 7

The stabilized polyoxymethylene diacetate compositions described in Example 2, 3 and 4 are melted in the Plasti Corder cell thermostated with heating oil at 220°C, the number of revolutions of the rotors being of 20 rev/min.

Tests are carried out with residence periods differing from one another. Table 3 summarized the results relating to said polyoxymethylene diacetate stabilized with poly caprolactam (POM-5), polyester polyamide (POM-6) and with the stabilized copolymer D—A—B—D (POM-7) in addition to the antioxidant.

Table 3

|  | POM-5 | | | POM-6 | | | POM-7 | | |
|---|---|---|---|---|---|---|---|---|---|
| Time | $\Delta C$ | $K_{220}$ | $\eta e$ | $\Delta C$ | $K_{220}$ | $\eta e$ | $\Delta C$ | $K_{220}$ | $\eta e$ |
| 6' | 0.6 | 0.21 | 1.75 | 0.5 | 0.14 | 1.76 | 0.4 | 0.08 | 1.77 |
| 12' | 0.8 | 0.12 | 1.73 | 0.7 | 0.08 | 1.75 | 0.5 | 0.05 | 1.77 |

Table 3-continued

| | POM-5 | | | POM-6 | | | POM-7 | | |
|---|---|---|---|---|---|---|---|---|---|
| 18' | 1.0 | 0.07 | 1.71 | 0.8 | 0.06 | 1.73 | 0.6 | 0.04 | 1.76 |

EXAMPLE 8

Preparation of the stabilizer

73 Parts alpha-pyrrolidone are admixed while stirring under inert anhydrous conditions at 60°C with 0.3 part finely divided sodium metal in a 50% parraffin dispersion. Upon formation of the metal-lactam, 100 parts anhydrous toluene are added. The mixture is heated to 35°, admixed with 35 parts δ-valerolactone, and maintained at this temperature during 3.5 hours. The thus formed copolymer A—B is thoroughly washed with a further amount of anhydrous toluene in order to remove soluble residues. The analysis of the copolymer A—B gives the following results:

| | |
|---|---|
| % conversion of the monomer charge | = 94.5 |
| nitrogen percentage | = 10.98 |
| lactam percentage | = 66.5 |
| reduced viscosity | = 1.25 |

By proceeding in the same manner as in Example 1, the resulting copolymer A—B is charged in a quantity of 200 parts to a reactor containing 1,000 parts toluene. Pure gaseous monomeric formaldehyde is introduced into the reactor in a quantity of 2.5 parts/minute during 10 minutes.

The resulting D—A—B—D copolymer is thoroughly washed with ethanol in hot, then dried. The copolymer D—A—B—D is esterified with acetic anhydride in the manner described in Example 1.

The following determinations are effected on the stabilized copolymer D—A—B—D.:

| | |
|---|---|
| overall yield percentage with respect to the feed | = 93.2 |
| nitrogen percentage | = 8.59 |
| A-B percentage | = 78.5 |
| intrinsic viscosity | = 1.31 |
| $K_{220}$ | = 0.008 |

Stabilization of the acetal polymer 6.0 Parts of a mixture containing 3 parts stabilized copolymer D—A—B—D to one part polyoxymethylene diacetate (intrinsic viscosity 1.35) are added together with 3 parts pentaerythritol tetra (beta-4'-hydroxy-3',5'-di-tert-butyl phenyl) propionate to 991 parts polyoxymethylene diacetate (intrisic viscosity 1.61).

After careful homogenization, the powder is melted and pelletized in the manner described in Example 1.

The pellets were then submitted to the thermal degradation tests and to a special heat treatment (CR - test) by utilizing an apparatus for the determination of the melt index. More particularly, the pellets are introduced into the apparatus and the melt index (in grams) is determined at 230°C after various residence periods with a charge of 2,160 grams. It is thus possible to follow the variation in time of fluidity, hence of the molecular weight, and simultaneously of the colour of the extruded products.

The results are summarized in Tables 4 and 5 sub POM-8.

EXAMPLE 9 (COMPARATIVE EXAMPLE)

A sample of polyamide prepared by copolymerization of hexamethylenediamine adipate, hexamethylenediamine sebacate and ε-caprolactam, in a weight ratio of 4:4:3, and pentaerythritol tetra(beta-40'-hydroxy-3',5'-di-tert-butyl phenyl) propionate together with are added in a proportion of 0.45 and 0.3%, respectively, to a polyoxymethylene diacetate in powder form similar to that employed in Example 8. The products are in fine powder form and the mixture is accurately homogenized.

The mixture is melted and pelletized as described in Example 1 and the pellets are submitted to the heat degradation tests and CR-test as in Example 8.

The results are given in Tables 4 and 5 sub POM-9.

Table 4

| | Colour | $K_{220}$ | $D_{220}$ | |
|---|---|---|---|---|
| | | | 10' | 20' |
| POM-8 | white | 0.04 | 0.5 | 1.0 |
| POM-9 | white | 0.05 | 0.8 | 1.3 |

Table 5 (CB-test)

| Time of residence | POM-8 | | POM-9 | |
|---|---|---|---|---|
| | Melt-index (grams) | colour | Melt-index (grams) | colour |
| 5' | 8.2 | white | 8.3 | white |
| 10' | 8.3 | " | 8.8 | " |
| 15' | 8.2 | " | 9.5 | " |
| 20' | 8.5 | " | 14.2 | yellowish-white |
| 30' | 12.2 | " | 32.5 | brown |
| 40' | 18.7 | yellowish-white | >50 | brownish-black |

EXAMPLE 10

A fraction of D—A—B—D copolymer prepared as described in Example 1 is etherified by means of a reagent comprising 09 part triethyl orthoformate, 15 parts dimethyl acetamide, 31 parts n-dodecane (to one part copolymer C—A—B—C) utilizing as a catalyst the diethyl sulphate in a proportion of 05% to the liquid total, at 128°–135°C during 10 minutes.

A thorough washing is effected with toluene containing 1% triethanolamine, then with acetone and drying at 60° in vacuum follows. The stabilized copolymer D—A—B—D exhibits the following properties:

| | |
|---|---|
| percentage of reaction yield | = 99.8 |
| nitrogen percentage | = 9.83 |
| A-B percentage | = 85.8 |
| intrinsic viscosity | = 1.35 |
| $K_{220}$ | = 0.003. |

987.5 Parts polyoxymethylene diethyl ether of intrinsic viscosity of 1.40 are admixed with 5.0 parts of a polymeric product obtained from caprolactam and beta-(4'-hydroxy-3',5'-di-tert-butylphenyl) propionic acid (weight ratio 75:25) and 7.5 parts of a mix containing 1 part of said stabilized D—A—B—D copolymer to two parts polyoxymethylene diethyl ether.

The formaldehyde polymer thus contains 0.25% of stabilized copolymer D—A—B—D and 0.5% of the above described antioxidant polymeric product.

After homogenization, pelletizing is carried out as in Example 1.

The thermal degradation tests are carried out on the pellets, the results being summarized in Table 6 sub POM-10.

EXAMPLE 11

989 Parts of an acetal copolymer of intrinsic viscosity 1.42, obtained by polymerization of trioxane with 2% ethylene oxide are admixed with 3.5 parts of 2,2'-methylenebis (4-methyl-6-tert-butylphenol) and 7.5 parts of a mix comprising 2 parts acetal copolymer to one part stabilized D—A—B—D copolymer described in Example 10.

In this manner, the acetal copolymer contains 0.25% of stabilized D—A—B—D copolymer and 0.35% antioxidant.

After accurate homogenization, melting and pelletizing are effected as in Example 1. The pellets are submitted to the thermal degradation tests, the results being given in Table 6 sub POM-11.

Table 6

| | colour | $K_{220}$ | $D_{220}$ | |
|---|---|---|---|---|
| | | | 10' | 20' |
| POM-10 | white | 0.02 | 0.4 | 0.9 |
| POM-11 | white | 0.02 | 0.5 | 1.0 |

We claim:
1. A stabilized composition comprising an acetal polymer having terminal ester, ether or urethane groups and from 0.02 to 12 parts by weight to 100 parts by weight of an acetal polymer of a block copolymer having a molecular weight of from 1,000 to 50,000 and having the general structure R—D—A—B—D—R, wherein
A is a polylactonic block consisting of recurring units

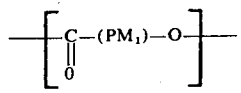

obtainable from at least one monomeric lactone of the formula:

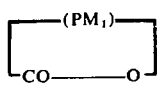

B is a polylactamic block consisting of recurring units

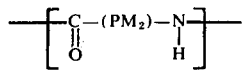

obtainable from at least one monomeric lactam of the formula:

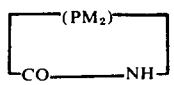

D is a polyoxymethylene block consisting of recurring units

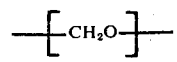

R is a terminal group selected from the class consisting of ester, ether and urethane groups, wherein PM₁ and PM₂ are linear polymethylene chains having from 2 to 13 and 3 to 13 carbon atoms, respectively, non-substituted or having at least one hydrogen atom replaced by a radical selected from the group consisting of alkyl, aryl, cycloalkyl and aryl alkyl radicals, the blocks D being present in the said copolymer in a proportion of from 5 to 90 percent by weight and the weight ratio of the blocks B to A ranging from 1:1 to 99:1.

2. The composition of claim 1, wherein the said lactone is selected from the group consisting of ε-caprolactone, δ-valerolactone, β-propiolactone, pivalolactone and ω-enanthiolactone.

3. The composition of claim 1, wherein the said lactam is selected from the group consisting of ε-caprolactam, α-pyrrolidone, ω-lauryllactam, ω-piperidone and α-enanthiolactam.

4. The composition of claim 1, wherein the weight ratio of the blocks B to A is from 3:1 to 99:1.

5. A stabilized composition comprising an acetal polymer having terminal ester, ether or urethane groups, from 0.02 to 2 parts by weight to 100 parts by weight of the acetal polymer of an antioxidant selected from the group consisting of substituted phenols and substituted bis phenols, and from 0.02 to 12 parts by weight to 100 parts by weight of an acetal polymer of a block copolymer having a molecular weight of from 1,000 to 50,000 and having the general structure R—D—A—B—D—R, wherein
A is a polylactonic block consisting of recurring units

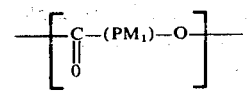

obtainable from at least one monomeric lactone of the formula:

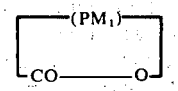

B is a polylactamic block consisting of recurring units

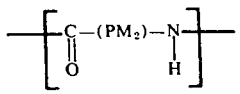

obtainable from at least one monomeric lactam of the formula:

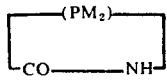

D is a polyoxymethylene block consisting of recurring units

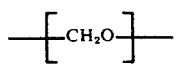

R is a terminal group selected from the class consisting of ester, ether and urethane groups, wherein $PM_1$ and $PM_2$ are linear polymethylene chains having from 2 to 13 and 3 to 13 carbon atoms, respectively, non-substituted or having at least one hydrogen atom replaced by a radical selected from the group consisting of alkyl, aryl, cycloalkyl and aryl alkyl radicals, the blocks D being present in the said copolymer in a proportion of from 5 to 90 percent by weight and the weight ratio of the blocks B to A ranging from 1:1 to 99:1.

6. The composition of claim 5, wherein the said lactone is selected from the group consisting of ε-caprolactone, δ-valerolactone, β-propiolactone, pivalolactone and ω-enanthiolactone.

7. The composition of claim 5, wherein the said lactam is selected from the group consisting of ε-caprolactam, α-pyrrolidone, ω-lauryllactam, ω-piperidone and α-enanthiolactam.

* * * * *

UNITED STATES PATENT OFFICE
CERTIFICATE OF CORRECTION

PATENT NO. : 3,979,481
DATED : September 7, 1976
INVENTOR(S) : PIERINO RADICI et al It is certified that error appears in the above-identified patent and that said Letters Patent are hereby corrected as shown below:

Column 1, line 50: replace "such" with --- each ---.

Column 6, line 23: the figures in microns at lines 26-28 should be printed in small print after "grain size".

Column 10, line 18: replace "beta 40" with --- beta 4' ---.

Column 10, line 36: replace "(CB-Test)" with --- (CR-Test) ---.

Column 10, line 52: replace "09" with --- 0.9 ---.

Column 10, line 52: replace "15" with --- 1.5 ---.

Column 10, line 53: replace "31" with --- 3.1 ---.
Column 10, line 54: replace "C-A-B-C" with --- D-A-B-D ---.
Column 10, line 55: replace "05%" with --- 0.5% ---.

Signed and Sealed this thirtieth Day of August 1977

[SEAL]

Attest:

RUTH C. MASON
Attesting Officer

C. MARSHALL DANN
Commissioner of Patents and Trademarks